United States Patent [19]
Krieger

[11] Patent Number: 5,609,769
[45] Date of Patent: *Mar. 11, 1997

[54] WATER TREATMENT METHODS

[75] Inventor: Joseph P. Krieger, Guthrie, Okla.

[73] Assignee: JTJ Systems, Inc., Edmond, Okla.

[*] Notice: The term of this patent shall not extend beyond the expiration date of Pat. No. 5,534,159.

[21] Appl. No.: 338,311

[22] Filed: Nov. 14, 1994

Related U.S. Application Data

[60] Division of Ser. No. 100,876, Aug. 1, 1993, which is a continuation-in-part of Ser. No. 969,615, Oct. 30, 1992, Pat. No. 5,288,737, which is a continuation of Ser. No. 616,583, Nov. 21, 1990, Pat. No. 5,173,184.

[51] Int. Cl.$^6$ ............................. C02F 1/24; C02F 11/12
[52] U.S. Cl. ......................... 210/704; 210/710; 210/770
[58] Field of Search ................... 210/704, 705, 210/710, 712, 718, 721, 738, 758, 765, 768, 769, 776, 800, 803, 805, 806, 910, 770

[56] References Cited

U.S. PATENT DOCUMENTS

| | | | |
|---|---|---|---|
| 832,914 | 10/1906 | Law | 210/5 |
| 1,314,955 | 9/1919 | Flicker | 210/5 |
| 1,440,254 | 12/1922 | Travers | 210/5 |
| 2,799,645 | 7/1957 | Musgrove | 210/5 |
| 3,056,749 | 10/1962 | Griffith | 252/361 |
| 3,133,017 | 5/1964 | Lambeth | 210/5 |
| 3,515,278 | 6/1970 | Wilson | 210/109 |
| 3,735,870 | 5/1973 | Uden | 210/138 |
| 3,787,316 | 1/1974 | Brink et al. | 210/704 |
| 3,898,159 | 8/1975 | Okabe et al. | 210/705 |
| 3,945,918 | 3/1976 | Kirk | 210/44 |
| 4,021,347 | 5/1977 | Teller et al. | 210/195 |
| 4,092,249 | 5/1978 | Lagatta | 210/195 |
| 4,116,835 | 9/1978 | Bertelson | 210/100 |
| 4,203,837 | 5/1980 | Hoge et al. | 210/705 |
| 4,278,546 | 7/1981 | Roesler | 210/626 |
| 4,378,290 | 3/1983 | Kennedy, Jr. | 210/103 |
| 4,462,903 | 7/1984 | Wettengl | 210/150 |
| 4,624,791 | 11/1986 | Ferriss | 210/704 |
| 4,800,025 | 1/1989 | Bibaeff | 210/221.2 |
| 4,950,396 | 8/1990 | Skaar et al. | 210/195.3 |
| 5,076,937 | 12/1991 | Montgomery | 210/705 |
| 5,308,499 | 5/1994 | Dixon et al. | 210/705 |
| 5,373,647 | 12/1994 | Bernes et al. | 34/382 |
| 5,433,863 | 7/1995 | Braden et al. | 210/712 |

*Primary Examiner*—Thomas G. Wyse
*Attorney, Agent, or Firm*—Dunlap & Codding, P.C.

[57] ABSTRACT

A wastewater treatment system wherein wastewater and air are passed into a mixing zone where the mixture is sprayed with water. The treated wastewater in the mixing zone is passed into a quiescent zone where light sludge is passed to the top of the quiescent zone and heavy sludge is passed to the bottom of the quiescent zone, the treated wastewater being disposed between the light sludge and the heavy sludge and the treated wastewater being passed from the quiescent zone into a discharge zone where the treated wastewater is discharged therefrom. The heavy sludge is discharged from the quiescent zone at predetermined discharge times and at predetermined intervals. The light sludge is passed from the quiescent zone into a light sludge bin where the light sludge is discharged therefrom for predetermined discharge time at predetermined discharge intervals. The heavy sludge and/or the light sludge then is passed into a drying system for drying the light sludge and the heavy sludge.

5 Claims, 6 Drawing Sheets

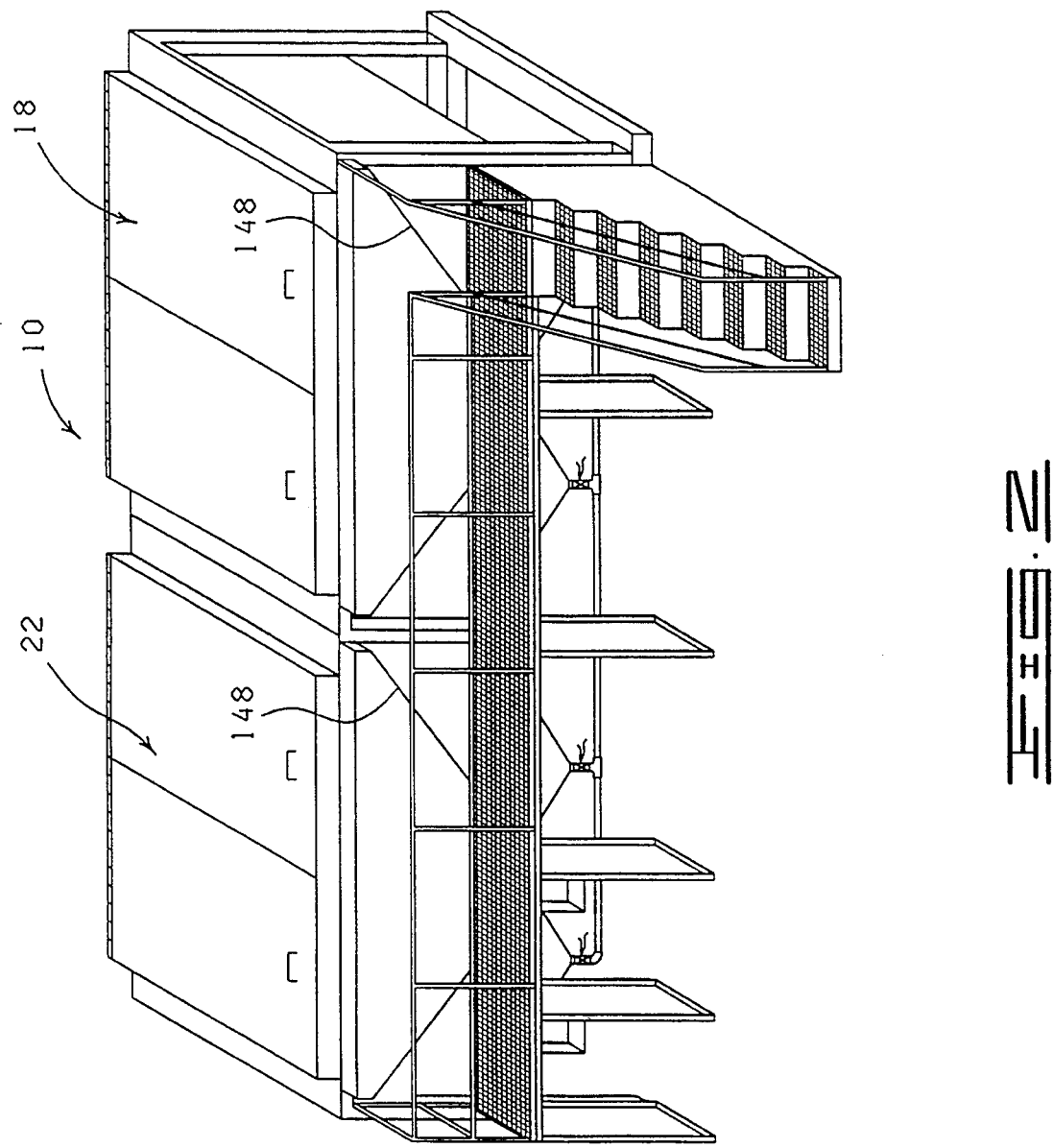

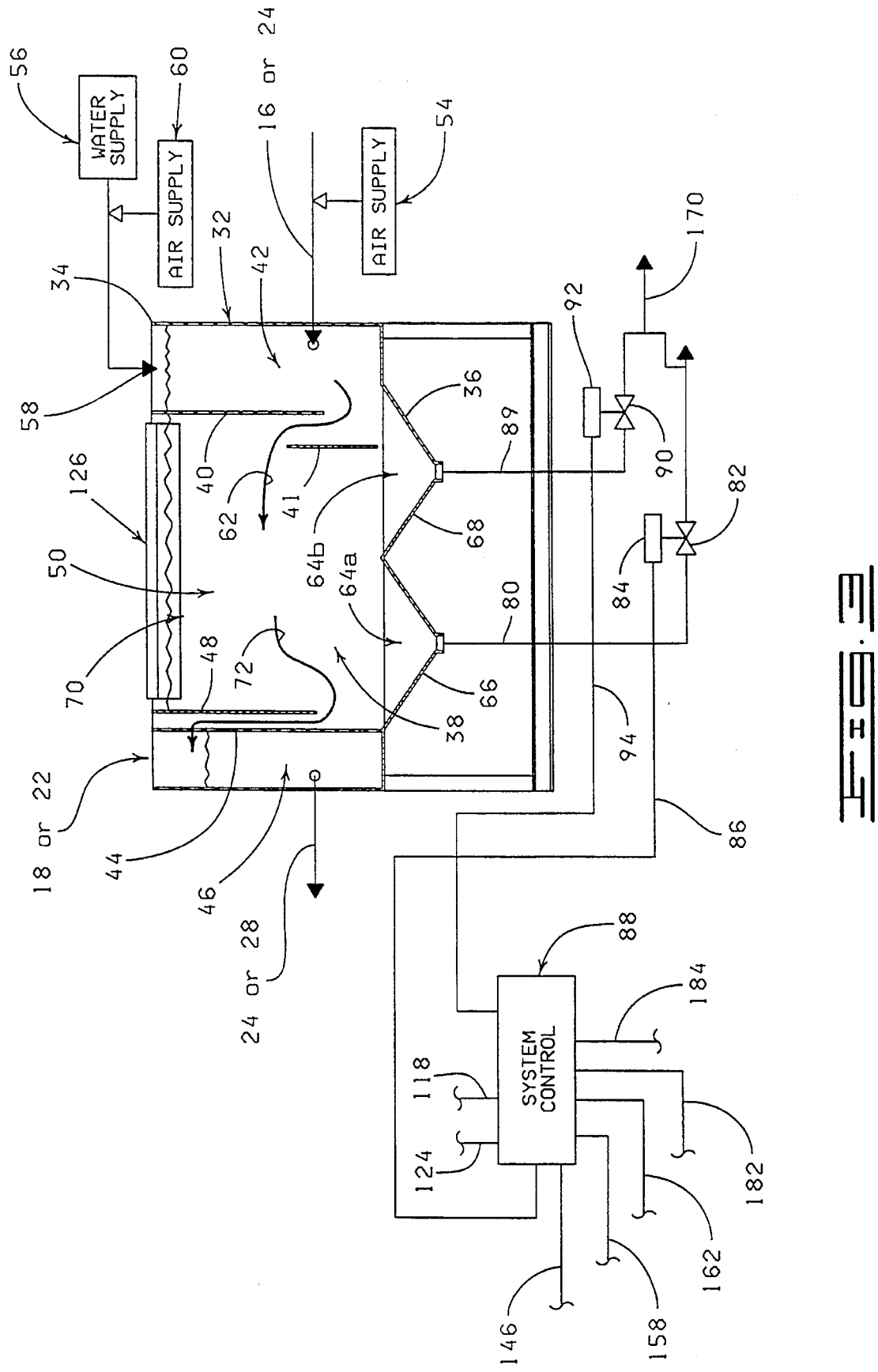

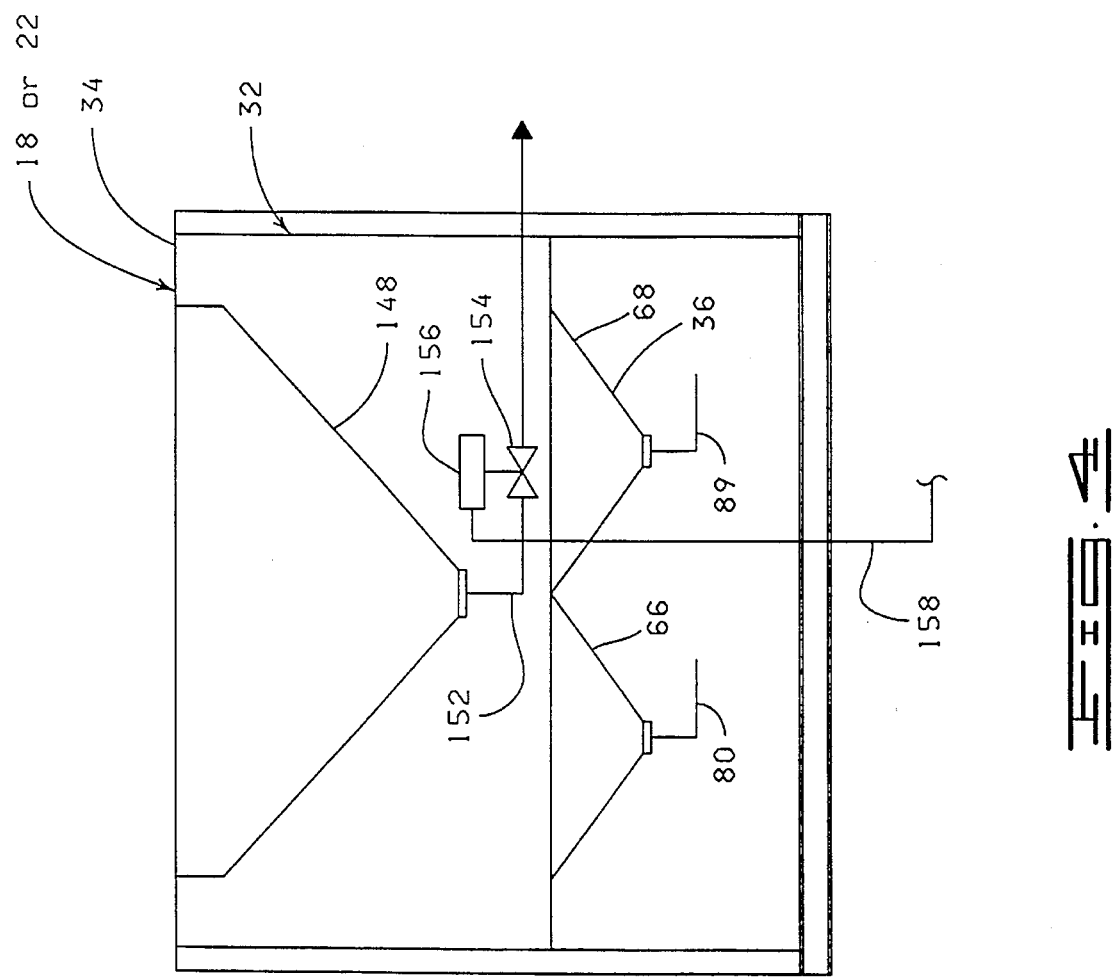

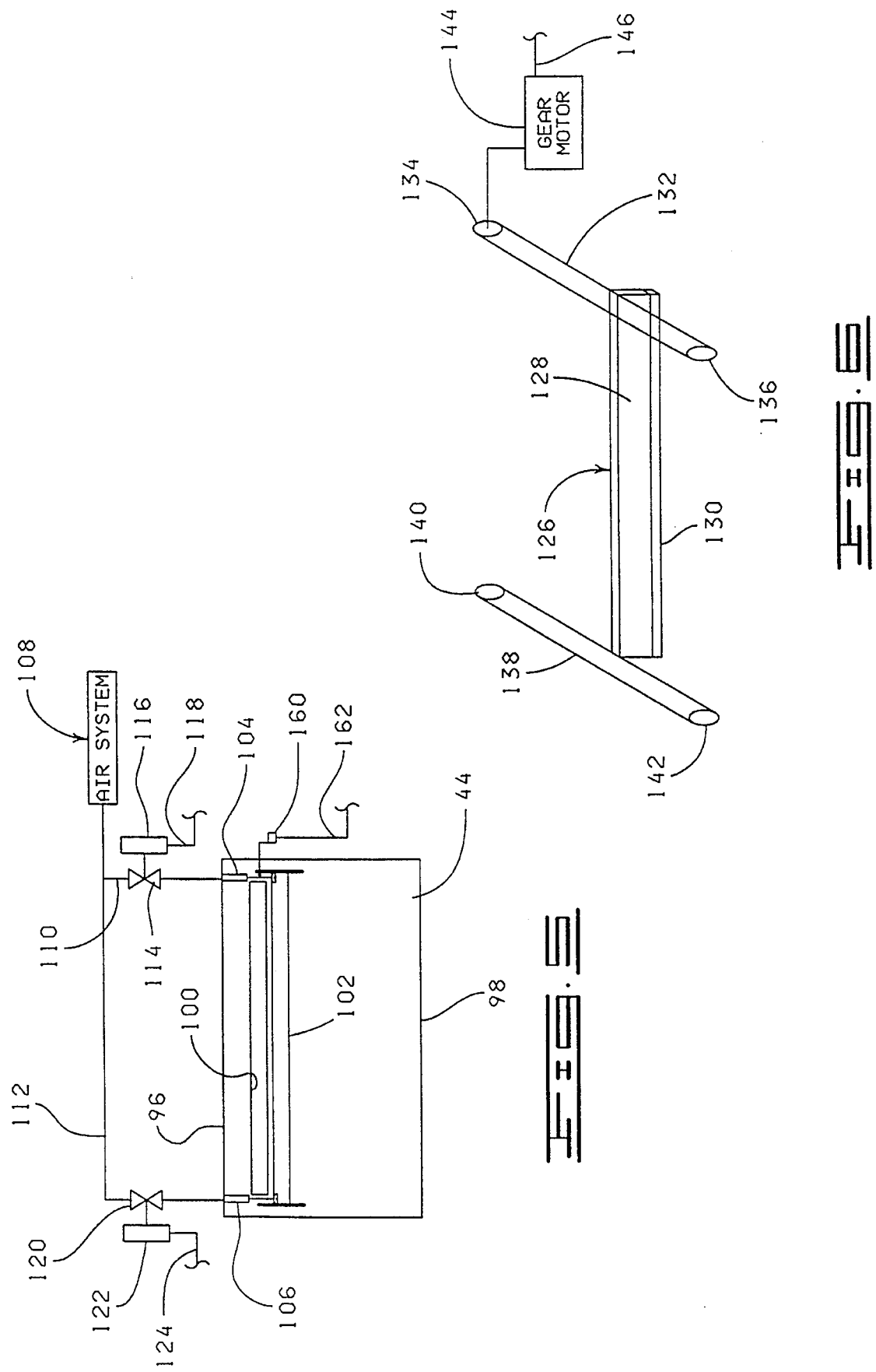

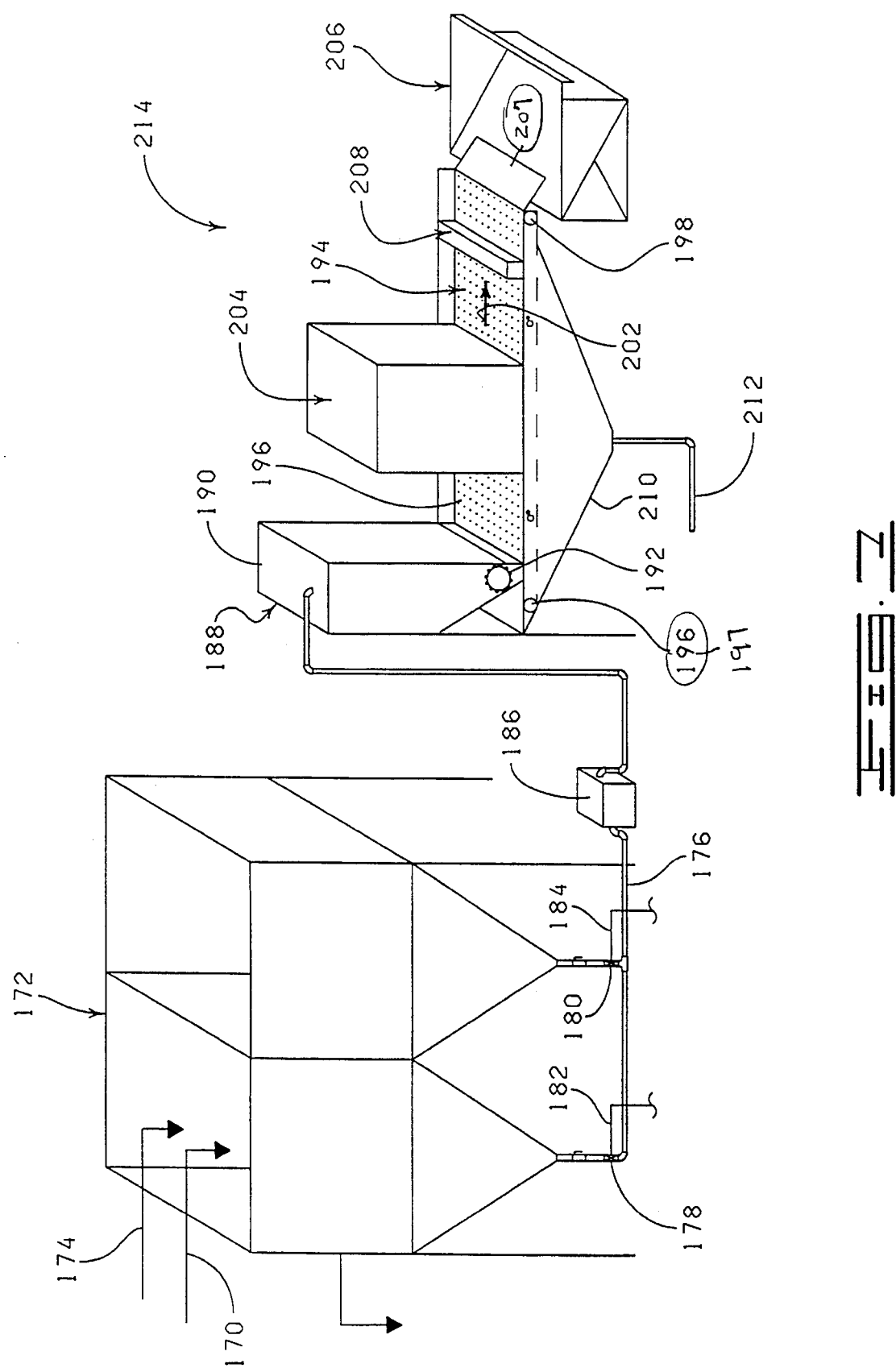

WATER TREATMENT METHODS

This is a divisional of copending application(s) U.S. Ser. No. 08/100,876, titled WASTEWATER TREATMENT METHODS AND APPARATUS, filed on Aug. 1, 1993; which is a continuation in part of application, U.S. Ser. No. 07/969,615, titled WASTEWATER TREATMENT APPARATUS AND METHOD, filed Oct. 30, 1992 now U.S. Pat. No. 5,288,737; which is a continuation of U.S. Ser. No. 07/616,583, titled WASTEWATER TREATMENT APPARAUS AND METHOD, filed Nov. 21, 1990, now U.S. Pat. No. 5,173,184, issued Dec. 22, 1992.

FIELD OF THE INVENTION

The present invention relates generally to wastewater treatment systems and, more particularly, but not by way of limitation, to a wastewater treatment system wherein control valves discharge sludge from the wastewater treatment system at predetermined discharge times and at predetermined discharge intervals, and wherein the sludge discharged from the wastewater treatment system is passed into a drying zone where the sludge is dried.

BRIEF DESCRIPTION OF THE DRAWINGS

FIG. 2 is a partial perspective, partial schematic front view of a portion of the wastewater treatment apparatus of FIG. 1, particularly showing the two treatment cells.

FIG. 3 is a sectional view of a typical treatment cell in the wastewater treatment apparatus shown in FIGS. 1 and 2 and schematically showing the controls for discharging sludge from the wastewater treatment apparatus.

FIG. 4 is an elevational view of the front side of the typical treatment cell shown in FIG. 3.

FIG. 5 is an elevational view of a portion of the treatment cell shown in FIG. 3.

FIG. 6 is a partial perspective, partial diagrammatic view of a rake for removing light sludge from the treatment cell shown in FIG. 3.

FIG. 7 is a perspective, diagrammatic view of the drying zone of the wastewater treatment apparatus showing where the sludge removed from the treatment cells in the wastewater treatment apparatus is dried.

FIG. 7A is a schematic view of the conveyor belt in the drying zone showing a spray bar for removing sludge from the openings in the conveyor belt.

DESCRIPTION OF THE PREFERRED EMBODIMENTS

Figure 1:
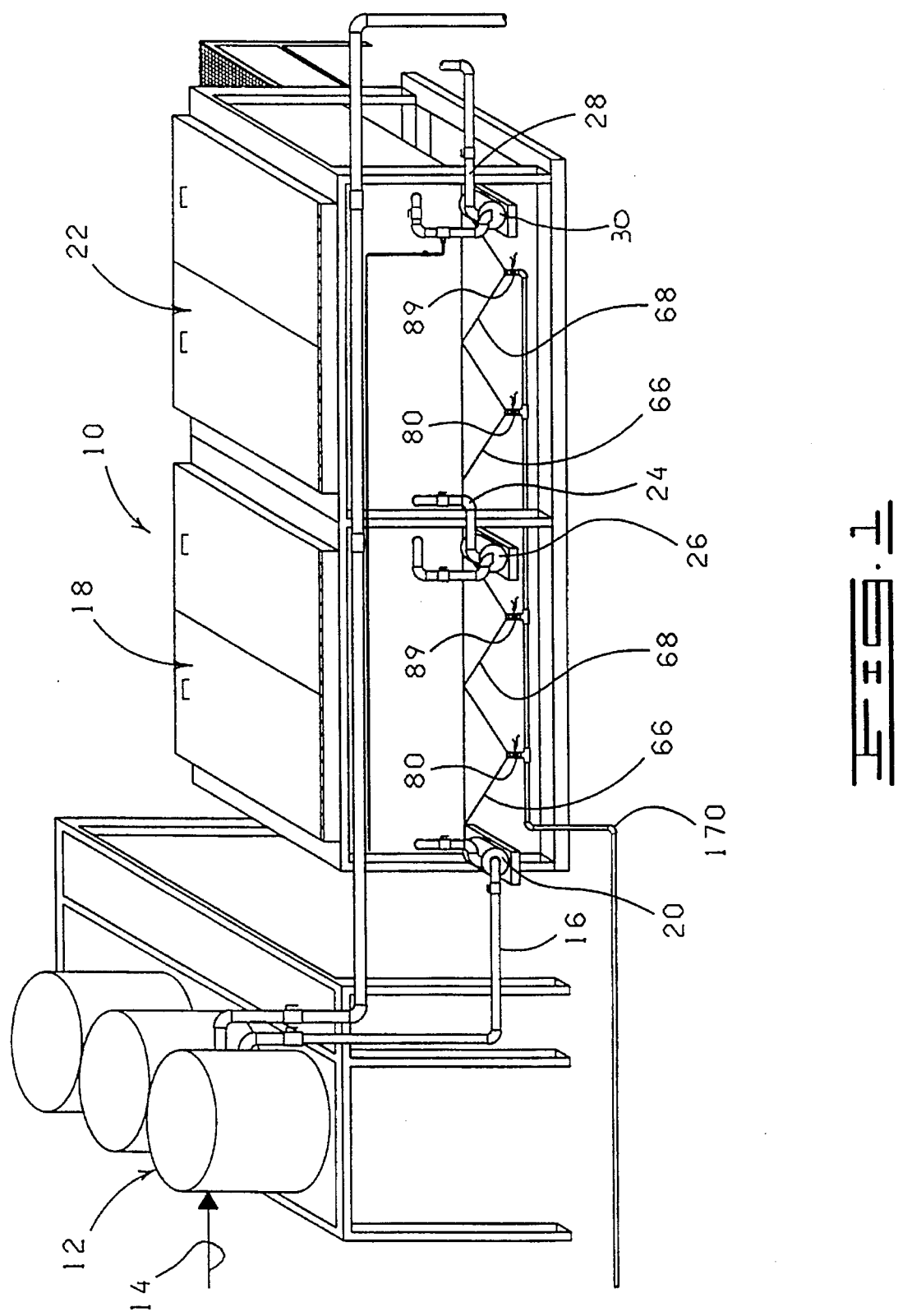
FIG. 1 is a partial perspective, partial schematic rear view of a wastewater treatment apparatus constructed in accordance with the present invention.

Shown in FIGS. 1 and 2 and designated by the general reference numeral 10 is a wastewater treatment apparatus constructed in accordance with the present invention. In general, wastewater is passed into tanks 12 (FIG. 1) by way of a conduit 14 (FIG. 1). The wastewater is passed from the tanks 12 through a conduit 16 (FIGS. 1 and 3) into a first treatment cell 18 (FIGS. 1, 2, 3 and 4). A pump 20 (FIG. 1) is interposed in the conduit 16 for pumping the wastewater into the first treatment cell 18.

The wastewater is treated in the first treatment cell 18. The treated wastewater is discharged from the first treatment cell 18 and passed into a second treatment cell 22 (FIGS. 1, 2, 3 and 4) by way of a conduit 24 (FIGS. 1 and 3). A pump 26 (FIG. 1) is interposed in the conduit 24 for pumping the treated wastewater from the first treatment cell 18 into the second treatment cell 22.

The wastewater is treated again in the second treatment cell 22 and the treated wastewater is passed or discharged from the second treatment cell 22 by way of a conduit 28 (FIGS. 1 and 3). A pump 30 (FIG. 1) is interposed in the conduit 28 for pumping the treated wastewater from the second treatment cell 22.

The first and the second treatment cells 18 and 20 are identical in construction and operation. A typical treatment cell 18 or 20 is shown in greater detail in FIG. 3. The treatment cell 18 or 20 includes a housing 32 (FIGS. 3 and 4) having a top 34 (FIGS. 3 and 4) and a bottom 36 (FIGS. 3 and 4). The housing 32 encompasses and defines an internal chamber 38 (FIG. 3).

A baffle 40 (FIG. 3) is connected to the housing 32 and supported within the internal chamber 38. The baffle 40 cooperates with a portion of the housing 32 to define a mixing zone 42. A baffle 41 is disposed in the internal chamber 38 near the baffle 40 for defining a path for the wastewater to be passed from the mixing zone 42.

A baffle 44 (FIGS. 3 and 5) is disposed in the internal chamber 38 near one end of the housing 32, opposite the end of the housing forming the mixing zone 42. The baffle 44 cooperates with a portion of the housing 32 to define a discharge zone 46 in the internal chamber 38. A baffle 48 (FIG. 3) is disposed in the internal chamber 38 and positioned near the baffle 44 for defining a path through which the treated wastewater passes into the discharge zone 46. The area in the internal chamber 38 between the baffle 48 and the baffle 40 or, in other words, between the mixing zone 42 and the discharge zone 46 defines a quiescent zone 50 (FIG. 3).

The wastewater passes into the mixing zone 42 via either the conduit 16 or the conduit 24 depending on whether the treatment cell is the first treatment cell 18 or the second treatment cell 22. Prior to passing the wastewater into the first treatment cell 18 and prior to passing the wastewater into the second treatment cell 22, compressed air from an air supply 54 (FIG. 3) is introduced into the wastewater. The compressed air is introduced into the wastewater in an amount sufficient so that large air bubbles are formed in the wastewater in the mixing zone of the treatment cell 18 or 22.

A water supply 56 (FIG. 3) is connected to spray nozzles 58 (FIG. 3) positioned above the liquid level in the mixing zone. Air from an air supply 60 (FIG. 3) is introduced into the water prior to the water being sprayed into the mixing zone via the nozzles 58.

The wastewater in the mixing zone is sprayed with water from the nozzles 58. The nozzles 58 are positioned above the liquid level of the wastewater in the mixing zone 42. The water is sprayed onto the surface of the wastewater in the mixing zone 42 so that the sprayed water contacts the large air bubbles in the mixing zone 42 and substantially reduces the size of the large air bubbles in the mixing zone.

The wastewater is passed from the mixing zone 42 into the quiescent zone 50 as indicated by the arrow 62 in FIG. 3. In the quiescent zone 50, heavy sludge is permitted to settle to the bottom of the housing 32 into a heavy sludge area 64 (FIG. 3) formed in the internal chamber 38 near the bottom 36 of the housing 32. More particularly, the bottom 36 of the housing 32 comprises two cone shaped members 66 and 68 (FIGS. 1, 3 and 4). The cone shaped members 66 and 68 surround and define the heavy sludge area 64 with the cone shaped members 66 defining a heavy sludge area 64a (FIG. 3) and the cone shaped members 68 defining a heavy sludge area 64b (FIG. 3).

In the quiescent zone 50, light sludge is permitted to rise to the upper liquid level of the wastewater in the quiescent zone 50 forming and defining a light sludge area 70 (FIG. 3) positioned near the top of the liquid level in the quiescent zone 50. The treated liquid portion of the wastewater in the quiescent zone 50 is disposed between the heavy sludge area 64 and the light sludge area 70 and this treated wastewater is passed from the quiescent zone 50 upwardly between the baffles 44 and 48 and discharged through an opening in the baffle 44 into the discharge zone 46 as indicated by the arrow 72 in FIG. 3. The treated wastewater is passed from the discharge zone 46 through either the conduit 24 into the second treatment cell 22 or through the conduit 28 out of the second treatment cell 22 depending upon whether the treatment cell shown in FIG. 3 is the first treatment cell 18 or the second treatment cell 20.

It should be noted that, although only two treatment cells 18 and 22 are shown in FIGS. 1 and 2, the wastewater treatment apparatus 10 of the present invention could include additional treatment cells all constructed like the treatment cell shown in FIG. 3 connected in series with the first and the second treatment cells 18 and 20 shown in FIGS. 1 through 3 and described before. It also should be noted that the wastewater treatment apparatus 10 may include only the first treatment cell 18 and, in this event, the treated wastewater is discharged from the first treatment cell 18 and passed to an area for removal or to a drying zone as will be described below.

The wastewater treatment apparatus 10 as described before is shown and described in detail in Applicant's co-pending application, U.S. Ser. No. 07/969,615, titled WASTEWATER TREATMENT APPARATUS AND METHOD, filed, Oct. 30, 1992; which is a continuation of Applicant's U.S. Pat. No. 5,173,184, titled WASTEWATER TREATMENT APPARATUS AND METHOD, issued Dec. 22, 1992, and the disclosures in this co-pending application and this issued patent hereby specifically are incorporated herein by reference.

It should be noted that in lieu of the two cone shaped members 66 and 68, a single cone shaped member could form the bottom 36 of the housing 30 thereby providing only one discharge area for the heavy sludge or two discharge areas could be provided in the single cone shaped member.

A discharge conduit 80 (FIGS. 1, 3 and 4) is connected to the cone shaped member 66 and the opening through the discharge conduit 80 is in fluidic communication with the heavy sludge area 64a. The heavy sludge in the heavy sludge area 64a is passed through the opening in the discharge conduit 80 and discharged from the heavy sludge area 64a during one aspect of the operation as will be described below.

A valve 82 (FIG. 3) is interposed in the conduit 80. The valve 82 has an opened position and a closed position. In the opened position, the valve 82 establishes fluidic communication through the conduit 80 for discharging the heavy sludge from the heavy sludge area 64a through the conduit 80 for transferring the heavy sludge to a disposal area or a drying zone as will be described below. The valve 82 is a solenoid or electrically operated type of valve and includes a valve controller 84 (FIG. 3) adapted to receive an electrical signal by way of a signal path 86 (FIG. 3) from a system control 88 (FIG. 3). The system control 88 is constructed and adapted to provide a signal via the signal path 86 to cause the valve 82 to be opened for predetermined discharge times and at predetermined discharge intervals for controlling the discharge of the heavy sludge from the heavy sludge area 64a.

A discharge conduit 89 (FIGS. 1, 3 and 4) is connected to the cone shaped member 68 and the opening through the discharge conduit 80 is in fluidic communication with the heavy sludge area 64b. The heavy sludge in the heavy sludge area 64b is passed through the opening in the discharge conduit 89 and discharged from the heavy sludge area 64b during one aspect of the operation as will be described below.

A valve 90 (FIG. 3) is interposed in the conduit 89. The valve 90 has an opened position and a closed position. In the opened position, the valve 90 establishes fluidic communication through the conduit 89 for discharging the heavy sludge from the heavy sludge area 64b through the conduit 89 for transferring the heavy sludge to a disposal area or a drying zone as will be described below. The valve 90 is a solenoid or electrically operated type of valve and includes a valve controller 92 (FIG. 3) adapted to receive an electrical signal by way of a signal path 94 (FIG. 3) from the system control 88. The system control 88 is constructed and adapted to provide a signal via the signal path 94 to cause the valve 90 to be opened for predetermined discharge times at a predetermined discharge intervals for controlling the discharge of the heavy sludge from the heavy sludge area 64b.

The baffle 44 in the treatment cell 18 or 22 is shown in greater detail in FIG. 5. The baffle 44 has an upper end 96 and a lower end 98. The lower end 98 is secured to the bottom of the housing 32 and the upper end 96 is positioned above the liquid level of the wastewater in the internal chamber 38 of the housing 32. An opening 100 is formed through the baffle 44 and positioned near the upper end 96. The treated wastewater passes through the opening 100 into the discharge zone 46.

As shown in FIG. 5, a cover plate 102 is supported below the opening 100 and positioned about adjacent the baffle 44. The cover plate 102 is sized to cover and substantially close the opening 100 during certain aspects of the operation as will be described in greater detail below.

As shown in FIG. 5, the cover plate 102 is supported by two pneumatic cylinders 104 and 106. In practice, the pneumatic cylinders 104 and 106 each are connected to an air supply 108 via a conduit 110 or 112 respectively. The pneumatic cylinders 104 and 106 utilize two air lines, one for passing air into the pneumatic cylinder 104 and 106 and each also includes a conduit for passing air from the pneumatic cylinders 104 and 106.

As shown in FIG. 5, a control valve 114 having a valve controller 116 is interposed in the conduit 110 for interrupting the communication between the air supply 108 and the pneumatic cylinder 104 in a closed position of the valve 114 and for establishing communication between the air supply 108 and the pneumatic cylinder 104 in an opened position of the valve 114. The valve controller 116 operates to receive an electrical signal via a signal path 118 (FIGS. 3 and 5) and, in response to receiving a signal via the signal path 118, the valve controller 116 opens the valve 114 establishing communication between the air supply 108 and the pneumatic cylinder 104.

As shown in FIG. 5, a control valve 120 having a valve controller 122 is interposed in the conduit 112 for interrupting the communication between the air supply 108 and the pneumatic cylinder 106 in a closed position of the valve 120 and for establishing communication between the air supply 108 and the pneumatic cylinder 106 in an opened position of the valve 120. The valve controller 122 operates to receive an electrical signal via a signal path 124 (FIGS. 3 and 5) and, in response to receiving a signal via the signal path 124, the valve controller 122 opens the valve 120 establishing communication between the air supply 108 and the pneumatic cylinder 106.

The signal paths 118 and 124 each are connected to the system control 88.

Each of the treatment cells 18 and 22 also includes a rake 126 (shown in FIG. 3 and shown in more detail in FIG. 6). The rake 126 comprises an elongated solid bar 128 (FIG. 6) having a rubber flap 130 (FIG. 6) attached to and extending a distance from the bottom of the bar 128.

A chain 132 (FIG. 6) is supported in the internal chamber 138 on two sprockets 134 and 136 (FIG. 6). Another chain 138 (FIG. 6) is supported in the internal chamber 38 on two sprockets 140 and 142. The chain 132 is spaced a distance from the chain 138 and the chains 132 and 138 extend generally along the opposite sides of the housing 32 and are disposed near the top 34 of the housing 32. The opposite ends of the bar 128 are connected to the respective chains 132 and 138. The chains 132 and 138 are positioned in the internal chamber 38 for supporting the bar 128 and the rubber flap 130 connected thereto near the liquid level of the wastewater in the quiescent zone 50 or, more particularly, to position a portion of the bar 126 and the rubber flap 130 in the light sludge area 70.

A DC gear motor 144 (FIG. 6) is connected to the sprocket 134 for drivingly rotating the sprocket 134 thereby drivingly moving the chain 132 connected thereto. The movement of the chain 132 causes the bar 128 and the rubber flap 130 connected thereto to be moved following the movement of the chain 132 which also causes the chain 138 to be rotated on the idler sprockets 140 and 142. The DC motor 144 is connected to the system control 88 via a signal path 146 (FIGS. 3 and 6).

In a non-operating position, the chains 132 and 138 are driven to position the bar 128 and the rubber flap 130 connected thereto near or adjacent one side of the treatment cell 18 or 22.

A light sludge bin 148 (FIGS. 2 and 4) is connected to one side of the housing 32 and an upper end 150 of the light sludge bin 148 is positioned near the open top 34 of the housing 32. The light sludge bin 148 has a cone shaped lower portion. A discharge conduit 152 (FIG. 4) is connected to a lower end of the light sludge bin 148 and positioned so that the opening in the conduit 152 is in fluidic communication with the interior space (not shown) in the light sludge bin 148.

A control solenoid type valve 154 (FIG. 6) is interposed in the discharge conduit 152. The control valve 154 has a valve controller 156 (FIG. 6) which is adapted to receive an electrical signal via a signal path 158 (FIGS. 3 and 4) from the system control 88.

The control valve 154 has an opened position and a closed position. In response to receiving a signal from the system control 88, the valve controller 156 causes the control valve 154 to be opened thereby establishing fluidic communication through the discharge conduit 152 and permitting light sludge in the light sludge bin 148 to be discharged therefrom.

The wastewater treatment apparatus 10 is constructed so that the discharge from the heavy sludge areas 64a and 64b in each of the treatment cells 18 and 22 is controlled by the system control 88 and so that the discharge of the light sludge from the light sludge bin 148 also is controlled via the system control 88. In operation and in a particular system, one may find that heavy sludge will build up quicker in one or more of the heavy sludge areas 64a and 64b of the treatment cells 18 or 22 and the system control 88 is adapted so that the discharge of the heavy sludge from the heavy sludge areas 64a and 64b of each of the treatment cells 18 and 22 is individually controllable.

In operation, the various discharge times are preset in the system control 88. At the predetermined discharge times, the system control 88 outputs a signal on the signal paths 86 and 94 and in response to such signals, the valve controllers 84 and 94 operate to open the control valves 82 and 90 thereby causing heavy sludge to be discharged through the discharge conduits 80 and 80a of the treatment cells 18 and 22. As noted before, the discharge times for discharging the heavy sludge in the heavy sludge areas 64a and 65b of the treatment cells 18 and 22 all could be different. The signals outputted by the system control 88 cause the respective valve controllers 84 and 92 to maintain the control valves 82 and 90 in the opened position for predetermined discharge intervals of time. Again, the predetermined discharge intervals of time can be the same or different for discharging the heavy sludge from the heavy sludge areas 64a and 64b of the treatment cells 18 and 22.

The system control 88 also is preset to output a signal on the signal paths 118 and 124 at a predetermined time and at predetermined time intervals thereby causing the valve controllers 116 and 124 to open the respective control valves 114 and 120 thereby establishing communication between the air supply 108 and the respective pneumatic cylinders 104 and 106. The pneumatic cylinders 104 and 106 cause the cover plate 102 to be moved upwardly to a position wherein the cover plate 102 closes or partially closes the opening 100 in the baffle 44. The closing or partial closing of the opening 100 by the cover plate 102 causes the liquid level or, more particularly, the light sludge level in the light sludge area 70 in the quiescent zone 50 to rise toward the top 34 of the housing 32 to a position wherein the rake 126 is disposed in and below the upper level of the light sludge in the light sludge area 70.

The cover plate 102 rises to a position wherein the cover plate 102 engages a limit switch 160 (FIG. 5) thereby causing a signal to be outputted on a signal path 162 (FIGS. 3 and 5) which is connected to the system control 88 indicating that the cover plate 102 has been positioned in a predetermined position covering a predetermined portion of the opening 100 in the baffle 44. In response to receiving the signal on the signal path 162, the system control 88 outputs a signal on the signal path 146 to the DC gear motor 144 energizing the DC gear motor 144 and causing the sprocket 134 to be drivingly rotated. In response to the driving rotation of the sprocket 134, the chain 132 is drivingly rotated thereby moving the rake 126 across the top of the quiescent zone 50. The rake engages the light sludge in the light sludge area 70 and moves the engaged light sludge causes the engaged light sludge to be passed into the opening in the light sludge bin 148.

In addition, the system controller 88 at predetermined discharge times outputs a signal on the signal path 158 thereby causing the valve controller 156 to open the control valve 154 for discharging light sludge from the light sludge bin through the discharge conduit 152. The system control 88 outputs the signal on the signal path 158 for causing the light sludge to be discharged from the light sludge bin 148 for predetermined discharge times and at predetermined discharge intervals.

The heavy sludge discharged from the heavy sludge areas 64a and 64b are passed through a common conduit 170 (FIGS. 1 and 3) and passed into storage tanks 172 (FIG. 7). The light sludge discharged from the light sludge bins 148 are passed through a common discharge conduit 174 (FIG. 7) and passed into the storage tanks 172.

In a preferred embodiment, the heavy sludge and the light sludge are discharged into a single conduit (combined conduits 170 and 174) and a pump (not shown) is interpored in said conduit form pumping the heavy sludge and the light sludge into the storage tanks 172. Said pump (not shown) is automatically started when the valves 84, 92 and 154 are opened.

The bottoms of the storage tanks 172 each are connected to a common discharge conduit 176 (FIG. 7). Control valves 178 and 180 (FIG. 7) are interposed in the discharge conduit 176 with the control valves 178 and 180 each controlling the discharge from one of the storage tanks 176. The control valves 178 and 180 are solenoid valves and each includes a valve controller (not shown). The system control 88 is adapted to output signals on signal paths 182 and 184 (FIGS. 3 and 7) for controlling (opening and closing) the respective control valves 178 and 180.

A pump 186 (FIG. 7) is interposed in the discharge conduit 176 for pumping the sludge from the storage tanks 172 in the opened position of either one or both of the control valves 178 and 180. The sludge is pumped into a distributor 188.

The distributor 188 comprises a housing 190 (FIG. 7) with an auger 192 (FIG. 7) disposed at a lower end thereof. The lower end of the housing 190 and the auger 192 disposed therein each are disposed above a perforated conveyor belt 194 (FIGS. 7 and 7A). The auger 192 functions to distribute the sludge disposed in the distributor 188 over the top of the perforated conveyor belt 194.

The perforated conveyor belt 194 has a plurality of openings 196 (FIG. 7) formed therethrough and spaced over the perforated conveyor belt 194. The perforated conveyor belt 194 is a continuous type of belt movably supported on two drive shafts 197 and 198 (FIGS. 7 and 7A). The drive shaft 198 is connected to a motor 201 (FIG. 7A) for drivingly rotating the drive shaft 198 connected thereto and rotatingly moving the perforated conveyor belt 194 in a direction 202 (FIGS. 7 and 7A).

The sludge is distributed on the perforated conveyor belt 194 by the distributor 188 and the sludge is moved via the perforated conveyor belt 194 in the direction 202 to a position wherein the sludge is disposed under an oven 204 which dries the sludge passing therethrough. Preferably, the oven 204 is a microwave type of oven for emitting microwave energy into the sludge for driving the water from the sludge. The water in the sludge passes through the openings 196 of the perforated conveyor belt 194. The dried sludge is passed from the oven 204 and discharged into a dumpster 206 (FIG. 7) or other type of container.

Preferably, a scraper 207 (FIG. 7) is located at the end of the conveyor belt 194. The scraper 207 blade is disposed about adjacent the conveyor belt 194 for scraping the dried sludge from the conveyor belt 194.

A blower 208 (FIG. 7) may be disposed above the perforated conveyor belt 194 for cooling the sludge dried by the oven 204 prior to discharging the sludge from the perforated conveyor 194 if desired. Further, additional heaters may be incorporated before and/or after the oven 204 for further driving the water from the sludge.

The water driven from the sludge and passed through the openings 196 in the perforated conveyor belt 194 passes into a drip pan 210 (FIG. 7) disposed below the perforated conveyor belt 194. The water is discharged from the drip pan 210 via a discharge conduit 212.

The distributor 188, the perforated conveyor belt 194, the oven 204 and the blower 208 cooperate to comprise a drying zone 214. In many instances, land fills will not take liquid sludge and the drying zone 214 of the present invention is adapted to dry the sludge prior to the sludge being discharged into the dumpster 206 for transportation to a waste disposal site such as a land fill.

Diagrammatically shown in FIG. 7A is the perforated conveyor belt 194. A spray bar 216 is disposed in the perforated conveyor belt 194 generally between the upper and the lower portions of the perforated conveyor belt 194. The spray bar 216 sprays water onto the lower portion of the perforated conveyor belt 194 for forcing particles of sludge which may have become lodged in the openings 196 to be passed through or discharged from the openings 196 and passed into the drip pan 210.

The valves have been described herein as being electrically operated. It should be noted that pneumatically or manually operated valves also would be suitable. Also, it should be noted that the motors described herein could be AC or DC or air driven type of motors.

If the sludge has a heavy concentration of oil or if the sludge is watery, materials can be added in the bins 172 for the thickening the sludge. Such thickening materials are well known such as dietmaterous earth or rice seed hulls or other similar materials. If high concentration of metals in the sludge, lime also can be added in the bins 172. In these instances, a mixer may be added in the bins 172 for mixing such materials with the sludge.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A method for treating wastewater comprising:

passing wastewater into a mixing zone in a housing;

introducing air into the wastewater prior to the wastewater being introduced into the mixing zone in an amount sufficient so that large air bubbles are formed in the mixing zone;

spraying water onto the wastewater in the mixing zone so that the sprayed water contacts the large air bubbles in the mixing zone and substantially reduces the size of the large air bubbles in the mixing zone;

passing the wastewater from the mixing zone into a quiescent zone where heavy sludge in the wastewater is permitted to move into a heavy sludge area and light sludge in the wastewater is permitted to move to a light sludge area in the quiescent zone, the treated wastewater being disposed between the light sludge area and the heavy sludge area, passing the treated wastewater from the quiescent zone into a discharge zone and discharging the treated wastewater from the discharge zone;

passing automatically the heavy sludge out from the heavy sludge area at predetermined discharge times and at predetermined discharge intervals;

removing the light sludge from the light sludge area in the quiescent zone and discharging automatically the light sludge removed from the quiescent zone at predetermined discharge times and at a predetermined time intervals.

2. The method of claim 1 further comprising:

passing the light sludge and the heavy sludge into a drying zone;

drying the light sludge and the heavy sludge in the drying zone.

3. The method of claim 1 further comprising:

passing the light sludge and the heavy sludge into a drying zone;

drying the light sludge and the heavy sludge in the drying zone with a microwave oven.

4. The method of claim 1 wherein the step of drying the light sludge and the heavy sludge in the drying zone further comprises:

passing the light sludge and the heavy sludge onto a perforated conveyor belt having a plurality of openings therein;

moving the perforated conveyor belt to move the light sludge and the heavy sludge to a position under a drying and drying the light sludge and the heavy sludge with the dryer and moving the perforated conveyor belt to move the heavy sludge and the light sludge from the dryer for discharging the dried light sludge and heavy sludge.

5. A method for drying sludge removed from a wastewater treatment apparatus comprising:

passing the sludge onto a perforated conveyor belt having a plurality of openings therein;

moving the perforated conveyor belt to move the sludge disposed thereon through an oven having a drying zone whereby water is driven from the sludge and passed through the openings in the perforated conveyor belt so that the sludge is dried by passage through the oven and moving the perforated conveyor belt through the oven to remove the dried sludge from the oven whereupon the dried sludge is discharged from the perforated conveyor belt; and discharging water removed from the sludge during the drying of same from the oven.

* * * * *

UNITED STATES PATENT AND TRADEMARK OFFICE
CERTIFICATE OF CORRECTION

PATENT NO. : 5,609,769
DATED : March 11, 1997
INVENTOR(S) : Joseph P. Krieger

Page 1 of 6

It is certified that error appears in the above-identified patent and that said Letters Patent is hereby corrected as shown below:

In the drawings, Figure 4, add element numeral --150-- as indicated below:

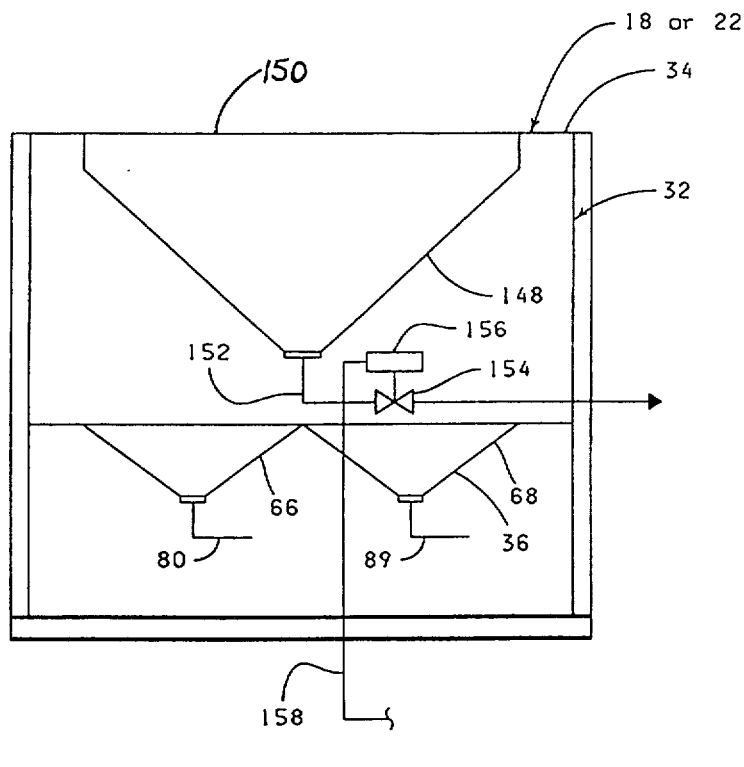

FIG. 4

UNITED STATES PATENT AND TRADEMARK OFFICE
CERTIFICATE OF CORRECTION

PATENT NO. : 5,609,769
DATED : March 11, 1997
INVENTOR(S) : Joseph P. Krieger

Page 2 of 6

It is certified that error appears in the above-identified patent and that said Letters Patent is hereby corrected as shown below:

In the drawings, Figure 7, change element numeral "196" to --197-- and add element numeral --207-- as indicated below:

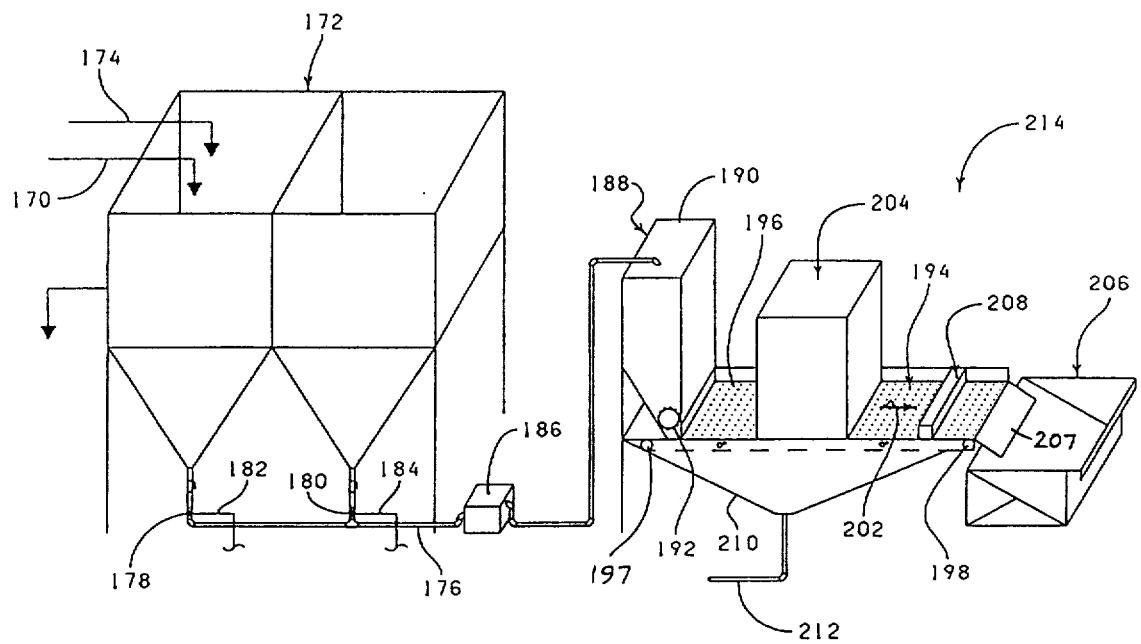

FIG. 7

UNITED STATES PATENT AND TRADEMARK OFFICE
CERTIFICATE OF CORRECTION

PATENT NO. : 5,609,769

DATED : March 11, 1997

INVENTOR(S) : Joseph P. Krieger

It is certified that error appears in the above-identified patent and that said Letters Patent is hereby corrected as shown below:

In the drawings, add Figure 7A, changing element numeral "196" to --197-- as indicated below:

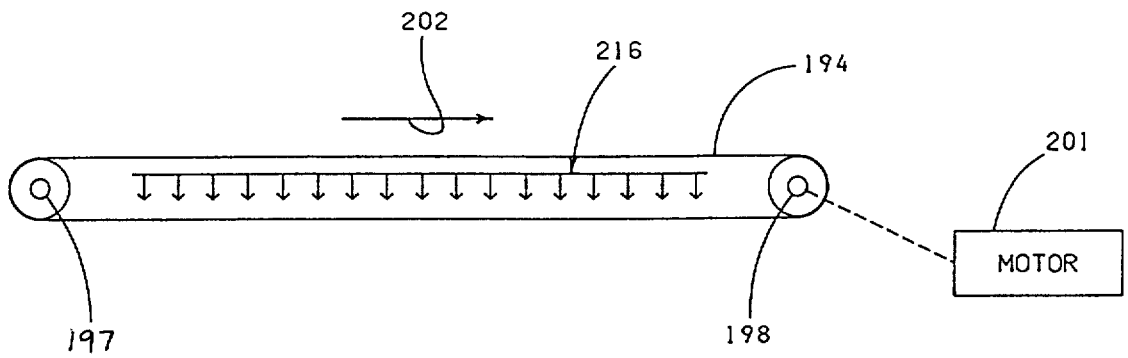

UNITED STATES PATENT AND TRADEMARK OFFICE
CERTIFICATE OF CORRECTION

PATENT NO. : 5,609,769

DATED : March 11, 1997

INVENTOR(S) : Joseph P. Krieger

It is certified that error appears in the above-identified patent and that said Letters Patent is hereby corrected as shown below:

Column 2, line 11, delete "treatment cells 18 and 20" and substitute therefor --treatment cells 18 and 22--.

Column 2, line 13, delete "treatment cells 18 and 20" and substitute therefor --treatment cells 18 and 22--.

Column 2, line 14, delete "treatment cells 18 and 20" and substitute therefor --treatment cells 18 and 22--.

Column 3, line 19, delete "second treatment cell 20" and substitute therefor --second treatment cell 22--.

Column 3, line 25, delete "treatment cells 18 and 20" and substitute therefor --treatment cells 18 and 22--.

Column 3, line 36, after "filed" delete ",".

Column 3, line 44, delete "housing 30" and substitute therefor --housing 32--.

Column 4, line 7, delete "discharge conduit 80" and substitute therefor --discharge conduit 89--.

Column 4, line 25, after "at" delete "a".

Column 5, lines 15-16, delete "internal chamber 138" and substitute therefor --internal chamber 38--.

UNITED STATES PATENT AND TRADEMARK OFFICE
CERTIFICATE OF CORRECTION

PATENT NO. : 5,609,769

DATED : March 11, 1997

INVENTOR(S) : Joseph P. Krieger

It is certified that error appears in the above-identified patent and that said Letters Patent is hereby corrected as shown below:

Column 5, line 27, delete "bar 126" and substitute therefor --bar 128--.

Column 5, line 51, delete "(FIG. 6)" and substitute therefor --(FIG. 4)--.

Column 5, line 53, delete "(FIG. 6)" and substitute therefor --(FIG. 4)--.

Column 6, lines 12-13, delete "controllers 84 and 94" and substitute therefor --controllers 84 and 92--.

Column 6, line 17, delete "areas 64a and 65b" and substitute therefor --areas 64a and 64b--.

Column 6, line 29, delete "controllers 116 and 124" and substitute therefor --controllers 116 and 122--.

Column 6, line 56, delete "moves the engaged light sludge".

Column 7, line 9, delete "interpored" and substitute therefor --interposed--.

Column 7, line 10, delete "form" and substitute therefor --for--.

Column 7, line 12, delete "valves 84, 92" and substitute therefor --valves 82, 90--.

UNITED STATES PATENT AND TRADEMARK OFFICE
CERTIFICATE OF CORRECTION

PATENT NO. : 5,609,769
DATED : March 11, 1997
INVENTOR(S) : Joseph P. Krieger

It is certified that error appears in the above-identified patent and that said Letters Patent is hereby corrected as shown below:

Column 7, line 18, delete "storage tanks 176" and substitute therefor --storage tanks 172--.

Column 8, line 26, delete "bins 172" and substitute therefor --storage tanks 172--.

Column 8, line 27, before "thickening" delete "the".

Column 8, line 30, delete "bins 172" and substitute therefor --storage tanks 172--.

Column 8, line 31, delete "bins 172" and substitute therefor --storage tanks 172--.

Column 8, line 67, after "at" delete "a".

Column 9, line 20, delete "drying", first occurrence, and substitute therefor --dryer--.

Signed and Sealed this

Twenty-third Day of December, 1997

Attest:

BRUCE LEHMAN

*Attesting Officer*  Commissioner of Patents and Trademarks